United States Patent

Field

| | |
|---|---|
| [11] Patent Number: | 5,615,438 |
| [45] Date of Patent: | Apr. 1, 1997 |

[54] COMPUTER MOUSE BALL AND PAD CLEANING KIT

[76] Inventor: Todd G. Field, 81 Fox Run Crrs, Richmond Hill, Ontario, Canada, L4C 8V5

[21] Appl. No.: 515,652

[22] Filed: Aug. 16, 1995

[51] Int. Cl.[6] .................................................. B08B 1/00
[52] U.S. Cl. ......................... 15/104.2; 15/21.2; 134/6; 206/524.3
[58] Field of Search .................... 134/6, 42, 84; 15/21.2, 23, 25, 26, 104.2; 206/205, 315.9, 524.3

[56] References Cited

U.S. PATENT DOCUMENTS

| 4,128,909 | 12/1978 | Kawabe et al. | 15/104.2 |
|---|---|---|---|
| 4,760,618 | 8/1988 | Chapin, Jr. | 15/104.93 |
| 5,153,254 | 10/1992 | Chen | 15/104.2 |
| 5,339,486 | 8/1994 | Persic, Jr. | 15/244.1 |
| 5,358,766 | 10/1994 | Field | 428/77 |
| 5,486,845 | 1/1996 | Chait | 345/163 |
| 5,519,910 | 5/1996 | Messina | 15/104.2 |

*Primary Examiner*—Jill Warden
*Assistant Examiner*—Jan M. Ludlow

[57] ABSTRACT

A kit for cleaning a tracking ball and pad of a computer mouse arrangement. The inventive kit includes a container having a tacky liner within which a mouse ball can be positioned and agitated to adhesively remove dirt therefrom. A roller having a tacky exterior coating can be manually reciprocated over a mouse pad to remove dirt therefrom to reduce subsequent fouling of the cleansed tracking ball of the mouse.

6 Claims, 3 Drawing Sheets

COMPUTER MOUSE BALL AND PAD CLEANING KIT

BACKGROUND OF THE INVENTION

1. Field of the Invention

The present invention relates to cleaning implements and more particularly pertains to a computer mouse ball and pad cleaning kit for cleaning a tracking ball and pad of a computer mouse arrangement.

2. Description of the Prior Art

The use of cleaning implements is known in the prior art. More specifically, cleaning implements heretofore devised and utilized are known to consist basically of familiar, expected and obvious structural configurations, notwithstanding the myriad of designs encompassed by the crowded prior an which have been developed for the fulfillment of countless objectives and requirements.

Known prior an cleaning implements include U.S. Pat. Nos. 5,339,486; 4,683,603; 3,758,912; 4,442,564; 4,899,413; 3,750,219.

While these devices fulfill their respective, particular objectives and requirements, the aforementioned patents do not disclose a computer mouse ball and pad cleaning kit for cleaning a tracking ball and pad of a computer mouse arrangement which includes a container having a tacky liner within which a mouse ball can be positioned and agitated to adhesively remove dirt therefrom, and a roller having a tacky exterior coating which can be manually reciprocated over a mouse pad to remove dirt therefrom.

In these respects, the computer mouse ball and pad cleaning kit according to the present invention substantially departs from the conventional concepts and designs of the prior art, and in so doing provides an apparatus primarily developed for the purpose of cleaning a tracking ball and pad of a computer mouse arrangement.

SUMMARY OF THE INVENTION

In view of the foregoing disadvantages inherent in the known types of cleaning implements now present in the prior art, the present invention provides a new computer mouse ball and pad cleaning kit construction wherein the same can be utilized for cleaning a tracking ball and pad of a computer mouse arrangement. As such, the general purpose of the present invention, which will be described subsequently in greater detail, is to provide a new computer mouse ball and pad cleaning kit apparatus and method which has many of the advantages of the cleaning implements mentioned heretofore and many novel features that result in a computer mouse ball and pad cleaning kit which is not anticipated, rendered obvious, suggested, or even implied by any of the prior art cleaning implements, either alone or in any combination thereof.

To attain this, the present invention generally comprises a kit for cleaning a tracking ball and pad of a computer mouse arrangement. The inventive kit includes a container having a tacky liner within which a mouse ball can be positioned and agitated to adhesively remove dirt therefrom. A roller having a tacky exterior coating can be manually reciprocated over a mouse pad to remove dirt therefrom to reduce subsequent fouling of the cleansed tracking ball of the mouse.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the an who are not familiar with patent or legal terms or phraseology, to determine quickly from a cursory inspection the nature and essence of the technical disclosure of the application. The abstract is neither intended to define the invention of the application, which is measured by the claims nor is it intended to be limiting as to the scope of the invention in any way.

It is therefore an object of the present invention to provide a new computer mouse ball and pad cleaning kit apparatus and method which has many of the advantages of the cleaning implements mentioned heretofore and many novel features that result in a computer mouse ball and pad cleaning kit which is not anticipated, rendered obvious, suggested, or even implied by any of the prior art tool guides either alone or in any combination thereof.

It is another object of the present invention to provide a new computer mouse ball and pad cleaning kit which may be easily and efficiently manufactured and marketed.

It is a further object of the present invention to provide a new computer mouse ball and pad cleaning kit which is of a durable and reliable construction.

An even further object of the present invention is to provide a new computer mouse ball and pad cleaning kit which is susceptible of a low cost of manufacture with regard to both materials and labor, and which accordingly is then susceptible of low prices of sale to the consuming public, thereby making such computer mouse ball and pad cleaning kits economically available to the buying public.

Still yet another object of the present invention is to provide a new computer mouse ball and pad cleaning kit which provides in the apparatuses and methods of the prior art some of the advantages thereof, while simultaneously overcoming some of the disadvantages normally associated therewith.

Still another object of the present invention is to provide a new computer mouse ball and pad cleaning kit for cleaning a tracking ball and pad of a computer mouse arrangement.

Yet another object of the present invention is to provide a new computer mouse ball and pad cleaning kit which includes a container having a tacky liner within which a mouse ball can be positioned and agitated to adhesively remove dirt therefrom, and a roller having a tacky exterior coating which can be manually reciprocated over a mouse pad to remove dirt therefrom.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
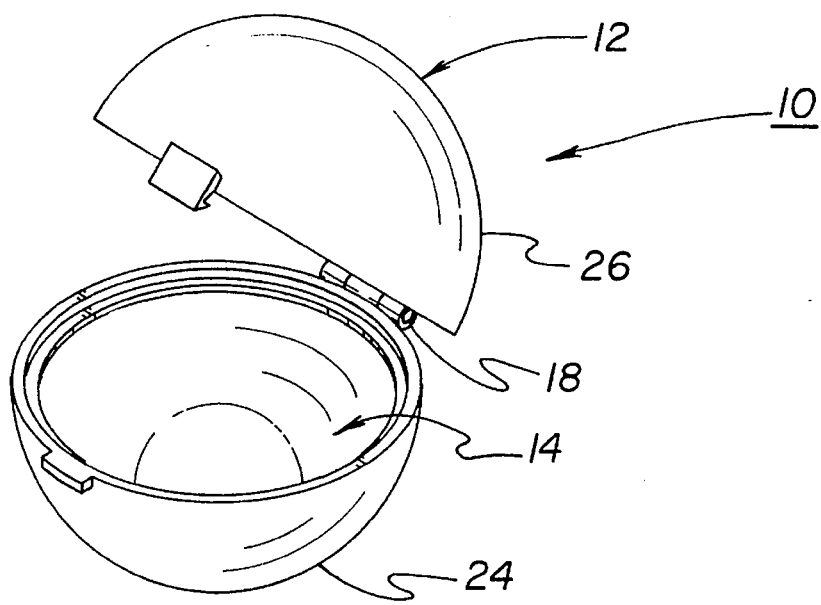
FIG. 1 is an isometric illustration of a portion of a computer mouse ball and pad cleaning kit according to the present invention.

With reference now to the drawings, and in particular to FIGS. 1–7 thereof, a new computer mouse ball and pad cleaning kit embodying the principles and concepts of the present invention and generally designated by the reference numeral 10 will be described.

Figure 2:
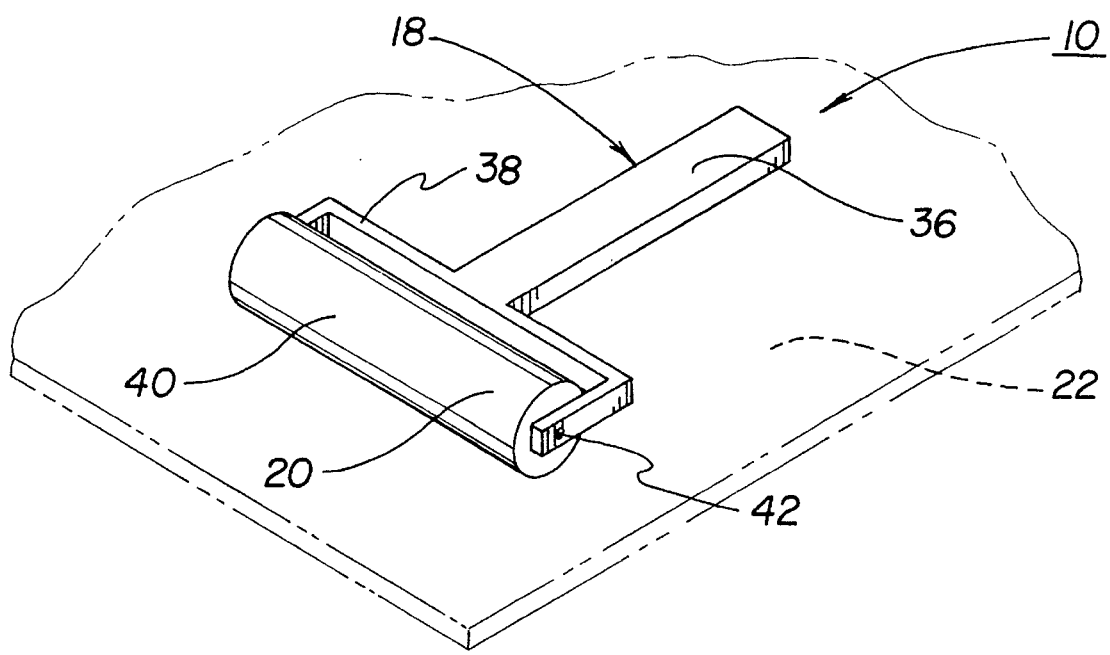
FIG. 2 is an isometric view of a further portion of the present invention.
Figure 5:
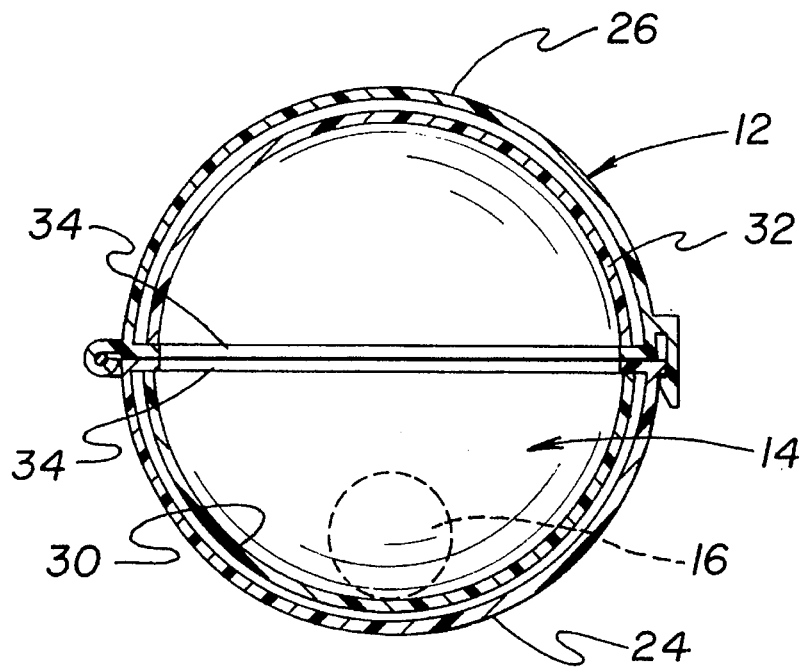
FIG. 5 is a cross sectional view taken along line 5—5 of FIG. 3.

More specifically, it will be noted that the computer mouse ball and pad cleaning kit 10 comprises an adhesive container 12 having a tacky liner 14 covering at least a portion of an interior surface of the adhesive container substantially as shown in FIG. 1 of the drawings. The adhesive container 12 can thus receive a tracking ball 16 of an unillustrated computer mouse when removed therefrom as shown in FIG. 5 of the drawings. The tracking ball 16 can thus be manually agitated within the adhesive container 12 such that the tacky liner 14 therewithin adhesively removes dirt and debris from an exterior surface of the tracking ball 16. As shown in FIG. 2, the present invention 10 further comprises an adhesive roller 18 having a tacky exterior coating 20 which can be manually reciprocated across an upper surface of a mouse pad 22 so as to remove dirt and debris from the mouse pad to reduce subsequent fouling of the cleansed tracking ball 16 of a computer mouse arrangement. By this structure, dirt and debris which could possibly foul and preclude proper operation of a computer mouse arrangement can be selectively removed from both the tracking ball 16 and the mouse pad 22 as desired.

Referring now to FIGS. 1 and 5, it can be shown that the adhesive container 12 of the present invention 10 preferably comprises a lower container portion 24 having an upper container portion 26 movably mounted relative thereto so as to permit selective insertion and/or removal of the tracking ball 16 therewithin as shown in FIG. 5. To this end, the upper container portion 26 can be pivotally mounted to the lower container portion 24 by a hinge 28 interposed therebetween. The tacky liner 14 includes a lower liner portion 30 positioned within the lower container portion 24, and an upper liner portion 32 positioned within the upper container portion 26. Preferably, the liner portions 30 and 32 coextensively cover interior surfaces of the respective lower and upper container portions 24 and 26.

With continuing reference to FIG. 5, it can be shown that the container portions 24 and 26 are preferably substantially hemi-spherical in configuration, with the liner portions 30 and 32 being correspondingly hemi-spherical in configuration so as to coextensively cover interior surfaces of the respective container portions 24 and 26. To removably retain the liner portions 30 and 32 within the respective container portions 24 and 26, each of the container portions includes a radially extending annular flange 34 projecting radially inwardly from the edge of the respective container portion 24 or 26. By this structure, the respective liner portions 30 and 32 can be resiliently deformed and positioned beneath the annular flange 34 of the respective container portion 24 and 26 so as to be retained therewithin.

Figure 3:
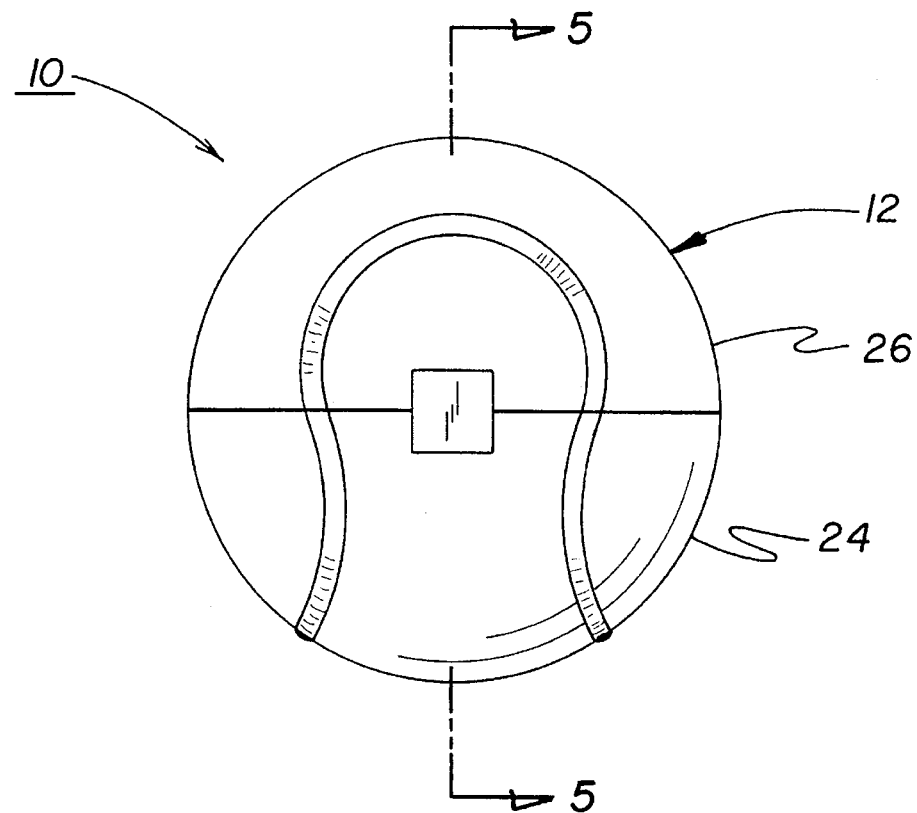
FIG. 3 is an elevation view of an alternative form of an adhesive container of the present invention.
Figure 4:
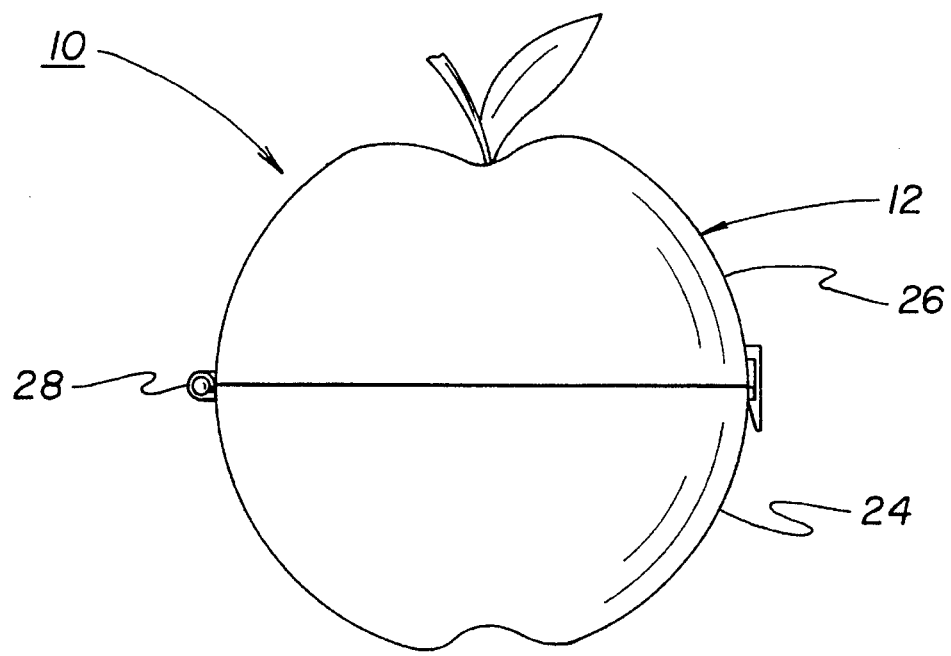
FIG. 4 is an elevation view of a further alternative form of the invention.

As shown in FIGS. 3 and 4, an exterior configuration of the adhesive container 12 can be provided to simulate various known objects for imparting aesthetic appeal to the invention 10. To this end, the adhesive container 12 can be shaped so as to resemble baseball as illustrated in FIG. 3 of the drawings, or alternatively shaped so as to resemble an apple as shown in FIG. 4 of the drawings.

Figures 6, 7:
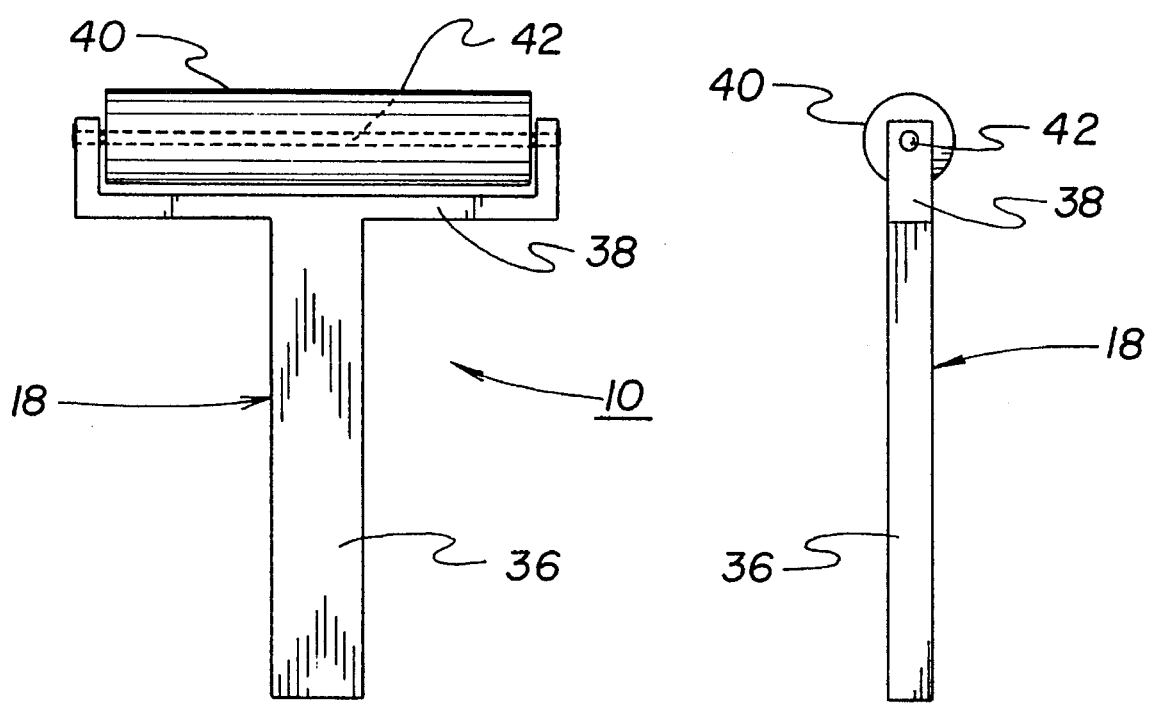
FIG. 6 is a top plan view of an adhesive roller of the invention.
FIG. 7 is a side elevation view of the adhesive roller.

Referring now to FIG. 2 with concurrent reference to FIGS. 6 and 7, it can be shown that the adhesive roller 18 of the present invention 10 preferably comprises an elongated handle 36 having a yoke 38 extending therefrom. A cylindrical roller 40 is rotatably mounted about an axle 42 extending across the yoke 38. The tacky exterior coating 20 of the adhesive roller 18 is applied to an exterior surface of the cylindrical roller 40 such that manual reciprocation of the cylindrical roller 40 over the upper surface of the mouse pad 22 as shown in FIG. 2 will result in an adhesive removal of dirt and debris from the upper surface of the mouse pad. By this structure, the mouse pad 22 can be thoroughly cleaned so as to preclude or reduce subsequent fouling of the cleansed tracking ball 16 of an associated mouse.

Preferably, the liner portions 30 and 32, as well as the cylindrical roller 40, are comprised of a substantially resiliently deformable polymeric material such as plastic or the like. The liner portions 30 and 32 are preferably coated with a tacky polyurethane material or other conventionally known tacky adhesive which removes and retains dirt and debris from the tracking ball 16 as it is agitated within the adhesive container 12. Further, the tacky exterior coating 20 of the cylindrical roller 40 of the adhesive roller 18 may similarly comprise a polyurethane material or other tacky adhesive conventionally known.

Regarding a shape of the interior of the adhesive container 12, it should be noted that the hemi-spherical shape of the container portions 24 and 26, and the corresponding hemi-spherical shape of the liner portions 30 and 32 permits for a greater area of contact between the tracking ball 16 and the tacky liner 14 as the tracking ball is agitated within the adhesive container 12 when considered relative to a parallel piped container having planar sides. However, it is within the intent and purview of the present invention to construct the adhesive container 12 to include planar interior or exterior surfaces.

In use, the computer mouse ball and pad cleaning kit 10 according to the present invention can be easily utilized for cleaning a tracking ball 16 and mouse pad 22 of an associated computer mouse arrangement. A method of utilizing the present invention 10 removing a tracking ball 16 from a computer mouse, positioning the tracking ball 16 within the adhesive container 12, agitating the tracking ball 16 within the adhesive container 12 such that din and debris are removed from the tracking ball and retained by the tacky liner 14, and subsequently reinstalling the tracking ball 16 into the associated mouse. The method of use of the present invention 10 may further comprise providing the adhesive roller 18 including the cylindrical roller 40 having a tacky exterior coating 20, and manually reciprocating the adhesive roller 18 across an upper surface of a mouse pad 22 so as to remove and retain dirt and debris from the mouse pad.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A computer mouse ball and pad cleaning kit comprising:

a container having an interior surface;

a tacky liner covering at least a portion of the interior surface of the container, said container comprising a lower container portion and an upper container portion movably mounted relative to the lower container portion so as to permit selective insertion and removal of a tracking ball therein, whereby the tracking ball of a computer mouse can be positioned within the container and manually agitated within the container such that the tacky liner therewithin adhesively removes dirt and debris from an exterior surface of the tracking ball; and an adhesive roller having a tacky exterior coating which can be manually reciprocated across an upper surface of a mouse pad so as to remove dirt and debris from the mouse pad.

2. The computer mouse ball and pad cleaning kit of claim 1, wherein the tacky liner includes a lower liner portion positioned within the lower container portion, and an upper liner portion positioned within the upper container portion.

3. The computer mouse ball and pad cleaning kit of claim 2, wherein the lower and upper liner portions coextensively cover interior surfaces of the respective lower and upper container portions.

4. The computer mouse ball and pad cleaning kit of claim 3, wherein the lower and upper container portions are substantially hemi-spherical in configuration, with the lower and upper liner portions being correspondingly hemi-spherical in configuration so as to coextensively cover interior surfaces of the respective lower and upper container portions.

5. The computer mouse ball and pad cleaning kit of claim 4, wherein each of the lower and upper container portions includes a radially extending annular flange projecting radially inwardly from an edge of the respective lower and upper container portion so as to removably retain the lower and upper liner portions within the respective lower and upper container portions.

6. The computer mouse ball and pad cleaning kit of claim 5, wherein the adhesive roller comprises an elongated handle having a yoke extending therefrom; a cylindrical roller rotatably mounted between the yoke, with the tacky exterior coating being applied to the exterior surface of the cylindrical roller such that manual reciprocation of the cylindrical roller over an upper surface of the mouse pad will result in an adhesive removal of dirt and debris from the upper surface of the mouse pad.

\* \* \* \* \*